Sept. 30, 1924.
G. F. C POWELL
1,510,159
MEANS FOR PACKING TIRES AND OTHER ARTICLES FOR TRANSPORT
Filed July 14, 1921
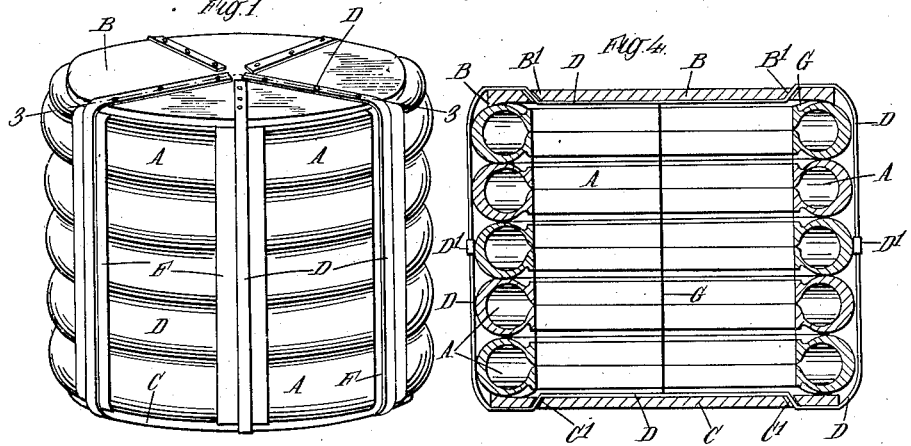
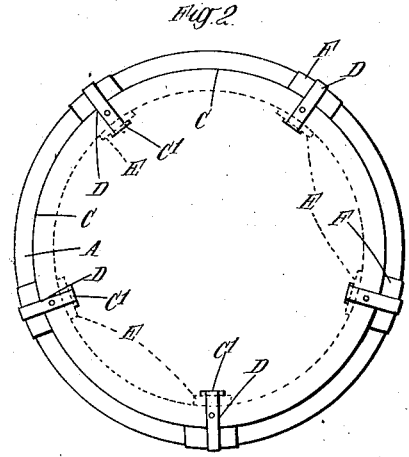
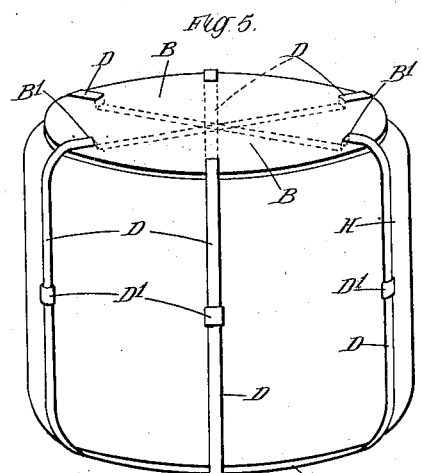
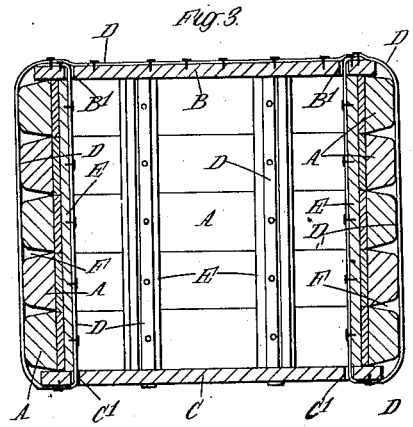
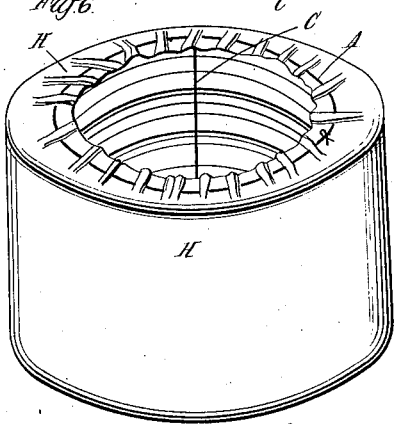

Patented Sept. 30, 1924.

1,510,159

UNITED STATES PATENT OFFICE.

GEORGE FREDERICK CHARLES POWELL, OF BIRMINGHAM, ENGLAND, ASSIGNOR TO THE DUNLOP RUBBER COMPANY, LIMITED, OF REGENTS PARK, LONDON, ENGLAND, A BRITISH COMPANY.

MEANS FOR PACKING TIRES AND OTHER ARTICLES FOR TRANSPORT.

Application filed July 14, 1921. Serial No. 484,684.

(GRANTED UNDER THE PROVISIONS OF THE ACT OF MARCH 3, 1921, 41 STAT. L., 1313.)

*To all whom it may concern:*

Be it known that I, GEORGE FREDERICK CHARLES POWELL, a subject of the King of Great Britain, residing at Para Mills, Aston Cross, Birmingham, in the county of Warwick, England, have invented certain new and useful Improvements in or Relating to Means for Packing Tires and Other Articles for Transport (for which I have filed an application in England May 1, 1920, Patent No. 166,747), of which the following is a specification.

This invention relates to means for packing tires and other articles for transport.

According to this invention a number of tires are stacked in a pile and end closing members are provided so that the space surrounded by the tires and adapted to be filled with various articles can be closed by the said members which are held in position by suitable retaining means. The stacked tires and the end closing members when secured together form a unit which facilitates transport of the tires and at the same time serves as a packing case or container for small articles such as small pneumatic tire covers, inner tubes, etc., which are to be dispatched to the same depot or place that the tires are to be sent to. The end closing members may be constituted by wooden discs and they may be secured together with the stacked tires interposed by means of metal bands or strips which may pass from one disc to the other inside or outside the tires and which may be attached to the said discs by nails, screws or similar fastening means; alternatively each disc may carry a number of metal strips which when the discs are placed in position at the ends of the stacked tires are adapted to lie outside the tires and in alignment so that the end of one set of strips can be secured to the ends of the other set of strips, by sealing or fastening means which avoid the use of nails, screws or the like. The stacked tires may be provided with an external canvas or Hessian covering or wrapping which may be suitably secured at the ends of the stacked tires prior to the fitting of the end closing discs. The invention is capable of use in connection with the packing and transporting of articles other than tires, for example, wheel rims or the like may be stacked and packed in the manner aforesaid.

In order that the said invention may be clearly understood and readily carried into effect, the same will now be described more fully with reference to the accompanying drawings, in which:—

Figure 1 is a perspective view showing a number of stacked tires secured between the closing members or discs by metal strips nailed to the said members or discs.

Figure 2 is a plan view showing the lower closing member or disc.

Figure 3 is a vertical sectional view taken approximately on the line 3—3 of Figure 1.

Figure 4 is a vertical sectional view of the modification in which the securing of the metal strips is effected by means other than nails or the like.

Figure 5 is a perspective view of the modification shown in Figure 4 showing the tires packed ready for transport.

Figure 6 is a fragmentary perspective view of the stacked tires with one end closing member or disc removed and showing one mode of securing the external canvas or Hessian covering or wrapping.

A A represent the tires stacked in a pile, Figures 1 and 3 illustrating solid tires whilst Figure 4 shows pneumatic tires. B and C represent respectively the upper and lower closing members which as shown are in the form of wooden discs and D D represent the metal strips or bands employed for securing the discs B and C at the ends of the stacked pile of tires so as to close the internal space within or surrounded by the stacked tires. In the example shown in Figures 1 to 3 the tires are stacked on the lower disc C and a number of slats E are vertically disposed at equidistant positions around the inner circumference of the tires, these slats having nailed thereto the metal securing strips D D which after being passed through holes C' in the lower disc are bent upwardly outside the stacked tires ready to be bent over on to the outer surface of the upper disc B, when this is placed in position on the stacked tires.

Prior to fitting the upper disc B, the internal space surrounded by the tires may be filled with articles such as small pneumatic tire covers, inner tubes, tire repair outfits, etc., which are not illustrated in the accompanying drawings. The upper disc is then placed on the stacked tires to close the internal space containing the small articles, and the upper ends of the strips D secured to the slats E are passed through holes B' in the upper disc so as to be bent over and nailed thereto (see Figure 3). The other ends of the strips D are then bent over and nailed onto the outer surfaces of the upper disc B to cover the previously secured ends. The strips D may also be nailed to the lower disc C adjacent to the point where they pass through the holes C' as shown in Figures 2 and 3. Thus the tires are securely held in form stacked between the discs B and C to form a unit which is convenient for transport and which constitutes a packing case for the small articles. If desired, protecting canvas or cardboard strips F may be secured around the stacked tires prior to the fixing of the discs B and C, in such positions that the metal strips D bear against the same as shown in Figures 1 and 3. The tires may however be completely surrounded by Hessian or canvas wrapping in order to afford protection to the same when the strips F may or may not be used or small pieces of cardboard may be placed under the metal strips D just at the points where they are bent round the uppermost and lowermost tires.

In the modification shown in Figures 4 and 5 the tires in stacked form are tied together by cord or the like G at a number of positions and are completely surrounded by a Hessian or canvas wrapping H which at each end of the stacked tires is turned over the end tire and a stout cord H' is threaded circumferentially through the turned over portion and tied to secure the wrapping H in position as shown in Figure 6. The discs B and C each carry a number of strips D, each strip lying on the inner surface and passing through diametrically disposed holes B' and C' in the discs so that the ends of the strips extend outwardly and can be bent to lie adjacent to the wrapping H surrounding the tires. When the discs have been placed at the ends of the stacked tires and after the space within the latter has been packed with small articles the strips D pertaining to the two discs are placed in diametrical alignment and their free ends are fastened together by any well known or suitable form of sealing or securing means as shown at D' in Figures 4 and 5. The pneumatic tire covers may if desired be stuffed or filled with articles such as folded inner tubes prior to packing other articles in the internal space surrounded by the tires.

What I claim and desire by Letters Patent of the United States is:—

1. A package comprising a stack or pile of tires or wheel rims, end closing discs having slits through the thickness of said discs, metal securing strips extending and bent through said slits and positive means for securing said strips to retain said discs closely against the end of the pile of tires or rims, so as to completely close the space surrounded by the tires or rims which space is packed with small articles, such as tire repair outfits, inner tubes and the like.

2. A package comprising in combination a stack or pile of tires or wheel rims, closing discs of about the same diameter as the annular tires or rims which discs close the interior space surrounded by the tires, metal strips bent through slits extending through the thickness of said discs, and positive retaining means whereby the strips retain the discs securely against the ends of the pile of tires and protective material interposed between the tires and the said strips.

3. A package comprising in combination a pile of tires or wheel rims, end closing discs of approximately the same diameter as the said tires or rims to completely close the space surrounded by said tires or rims and retain various articles such as tire repair outfits, inner tubes, and the like packed within said space, metal securing strips bent through slits in the thickness of said closing discs, means for securing the metal strips so as to retain the discs close against the ends of the pile of annular articles and protective material interposed between said strips and the exterior of the tires.

4. A package of the class described having in combination a pile of tires or wheel rims, closing discs of substantially the same diameter as the tires or wheel rims positioned at each end of said pile, a series of vertically disposed slats arranged adjacent the outer periphery of said disc, and adapted to contact with the inner periphery of said tires or wheel rims, flexible fastening means secured to said slats and extending over the said tires or wheel rims for drawing the discs together for the purpose specified.

5. A package of the class described having in combination a pile of tires or wheel rims, closing discs of substantially the same diameter as the tires or wheel rims positioned at each end of said pile, slits in said discs, vertically disposed slats arranged adjacent the outer periphery of said disc, and adapted to abut the inner periphery of said tires or wheel rims, flexible fastening means secured to said slats adapted to extend through said slits and over said pile of tires or wheel rims to draw the discs together for the purpose specified.

6. A package of the class described having in combination a pile of tires or wheel rims, closing discs of substantially the same diameter as the tires or wheel rims positioned at each end of said pile, slits in said discs, vertically disposed slats arranged adjacent the outer periphery of said discs, and adapted to abut the inner periphery of said tires or wheel rims, flexible fastening means secured to said slats adapted to extend through said slits and over side pile of articles and be secured at their free ends to one of said discs for the purpose specified.

GEORGE FREDERICK CHARLES POWELL.